(12) United States Patent
Ramamurthy et al.

(10) Patent No.: US 11,849,186 B1
(45) Date of Patent: Dec. 19, 2023

(54) DATA STORAGE DEVICE AND METHOD FOR ENABLING METADATA-BASED SEEK POINTS FOR MEDIA ACCESS

(71) Applicant: Western Digital Technologies, Inc., San Jose, CA (US)

(72) Inventors: Ramkumar Ramamurthy, Bangalore (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/839,628

(22) Filed: Jun. 14, 2022

(51) Int. Cl.
*H04N 21/472* (2011.01)
*H04N 21/278* (2011.01)
*H04N 21/845* (2011.01)

(52) U.S. Cl.
CPC ..... *H04N 21/47217* (2013.01); *H04N 21/278* (2013.01); *H04N 21/8455* (2013.01)

(58) Field of Classification Search
None
See application file for complete search history.

(56) References Cited

U.S. PATENT DOCUMENTS

| | | | | |
|---|---|---|---|---|
| 5,596,736 A * | 1/1997 | Kerns | ............ | G06F 12/0804 711/170 |
| 9,158,974 B1 * | 10/2015 | Laska | ............ | H04N 23/667 |
| 10,373,461 B2 * | 8/2019 | Li | ............ | G08B 13/1961 |
| 11,328,511 B2 | 5/2022 | Muthiah et al. | | |
| 2002/0144277 A1 * | 10/2002 | Friedman | ............ | G11C 7/16 348/E7.071 |
| 2010/0088726 A1 * | 4/2010 | Curtis | ............ | G11B 27/034 725/45 |
| 2013/0201290 A1 * | 8/2013 | Holland | ............ | H04N 7/188 348/46 |
| 2015/0007983 A1 * | 1/2015 | Tjhang | ............ | E21B 21/00 166/250.01 |
| 2015/0256835 A1 | 9/2015 | Sakai | | |
| 2016/0100226 A1 * | 4/2016 | Sadler | ............ | H04N 21/47202 725/38 |
| 2017/0017855 A1 * | 1/2017 | Karsh | ............ | H04N 23/683 |
| 2017/0345458 A1 | 11/2017 | Berglund et al. | | |
| 2018/0213274 A1 | 7/2018 | Song et al. | | |
| 2020/0357444 A1 | 11/2020 | Qin et al. | | |
| 2021/0064280 A1 | 3/2021 | Gunda et al. | | |

OTHER PUBLICATIONS

International Search Report and Written Opinion issued in PCT Application No. PCT/US2023/021273 dated Aug. 24, 2023 (9 pages).

* cited by examiner

*Primary Examiner* — Jason K Lin
(74) *Attorney, Agent, or Firm* — Crowell & Moring LLP (57) ABSTRACT

A data storage device and method for enabling metadata-based seek points for media access are provided. In one embodiment, a data storage device is provided comprising a memory and a controller. The controller is configured to identify a plurality of frames in video data that differ from surrounding frames by more than a threshold amount; store identifiers of the plurality of frames in the memory; and send the identifiers to the host to enable quick playback of the video data by the host. Other embodiments are possible, and each of the embodiments can be used alone or together in combination.

20 Claims, 8 Drawing Sheets

“DATA STORAGE DEVICE AND METHOD FOR ENABLING METADATA-BASED SEEK POINTS FOR MEDIA ACCESS”

BACKGROUND

A data storage device can store a data stream sent to it by a host of a surveillance system. The data can be stored in the Moving Picture Experts Group Transport Stream (MPEG-TS) format. Frames of interest (e.g., where certain action happens) can be scattered across the entire video recording, where periods of inactivity are interspersed with periods of activity. Identification of these frames of interest is not straightforward, as it involves a user retrieving the entire stored video from the data storage device and going through the footage manually at a normal or faster playback speed. This requires a lot of manual work as frames cannot be skipped and must be browsed through to identify any activity.

DETAILED DESCRIPTION

Overview

By way of introduction, the below embodiments relate to a data storage device and method for enabling metadata-based seek points for media access. In one embodiment, a data storage device is provided comprising a memory and a controller. The controller is configured to identify a plurality of frames in video data that differ from surrounding frames by more than a threshold amount; store identifiers of the plurality of frames in the memory; and send the identifiers to the host to enable quick playback of the video data by the host.

In some embodiments, the identifiers comprise metadata.

In some embodiments, the identifiers comprise frame numbers.

In some embodiments, the identifiers are sent to the host using a vendor-specific command.

In some embodiments, the identifiers are sent to the host in response to receiving a quick-playback request from the host.

In some embodiments, the identifiers are sent to the host in response to receiving a request from the host for the identifiers.

In some embodiments, the controller is further configured to identify the plurality of frames based on entropy changes in the video data.

In some embodiments, the controller is further configured to determine a best set of frames based on image clarity.

In some embodiments, the identifiers are sent to the host as a suggestion that the host is free to accept or disregard.

In some embodiments, the controller is further configured to identify the plurality of frames using an algorithm that is based on a host configuration.

In some embodiments, identifying the plurality of frames, the controller is further configured to identify frames that contain an object of interest provided by the host.

In some embodiments, the memory comprises a three-dimensional memory.

In another embodiment, a method is provided comprising identifying a plurality of frames in video data that contain a threshold amount of entropy change; storing seek points for the plurality of frames as metadata in the memory, wherein the seek points are set at non-sequential logical addresses in the memory; and sending the seek points to the host.

In some embodiments, the seek points comprise frame numbers.

In some embodiments, the seek points are sent to the host using a vendor-specific command.

In some embodiments, the seek points are sent to the host in response to receiving a quick-playback request from the host.

In some embodiments, the seek points are sent to the host in response to receiving a request from the host for the seek points.

In some embodiments, the method further comprises determining a best set of frames based on image clarity.

In some embodiments, the seek points are sent to the host as a suggestion that the host is free to accept or disregard.

In another embodiment, a storage system is provided comprising a memory; means for identifying a plurality of frames in video data for quick playback; and means for sending metadata-based markers identifying the plurality of frames to the host for quick playback.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
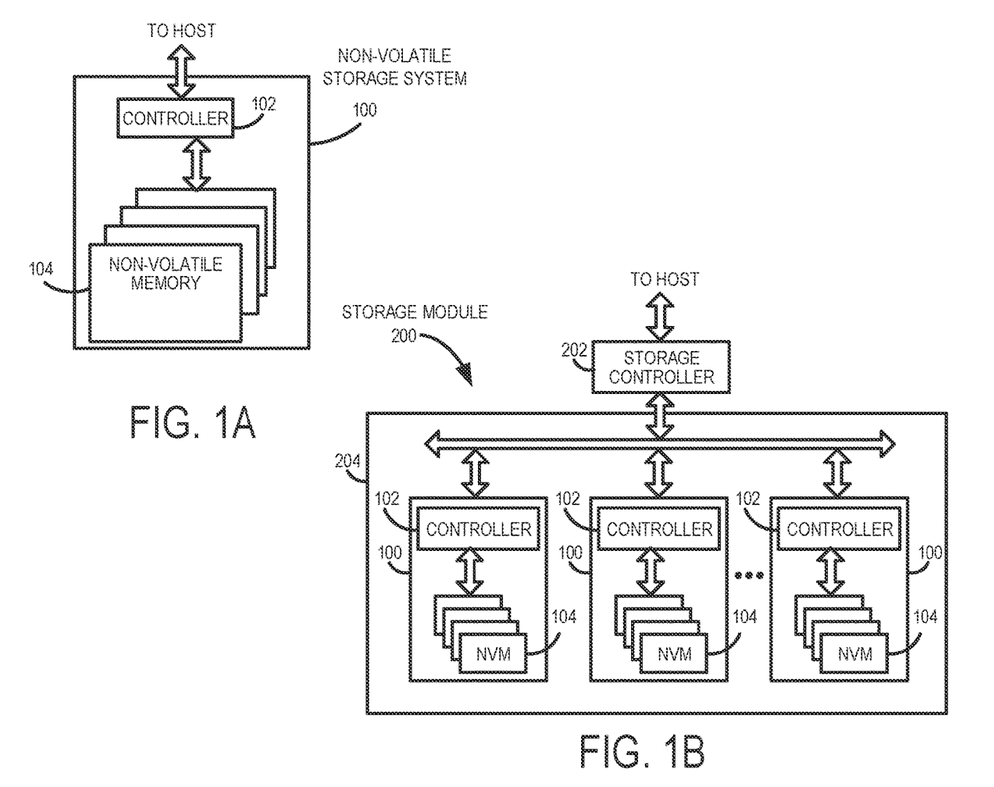
FIG. 1A is a block diagram of a data storage device of an embodiment.
FIG. 1B is a block diagram illustrating a storage module of an embodiment.
Figure 1C:
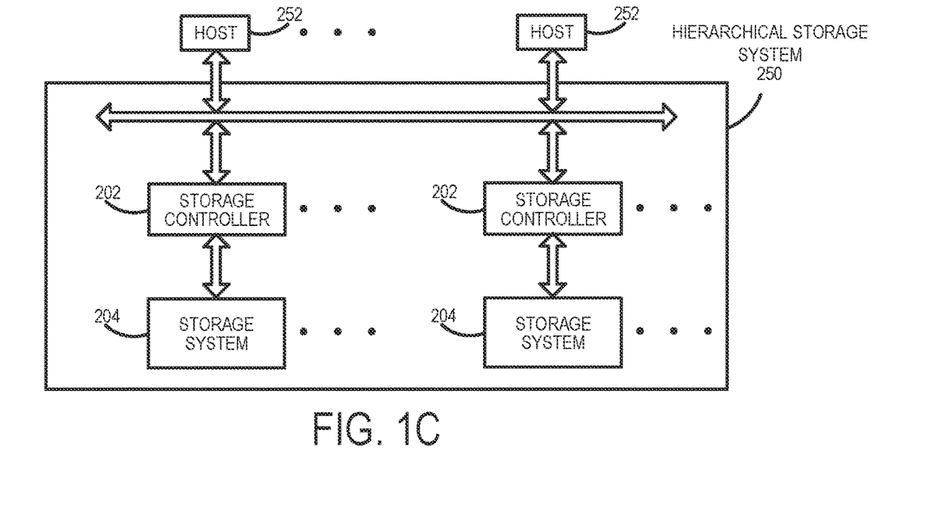
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate.

Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
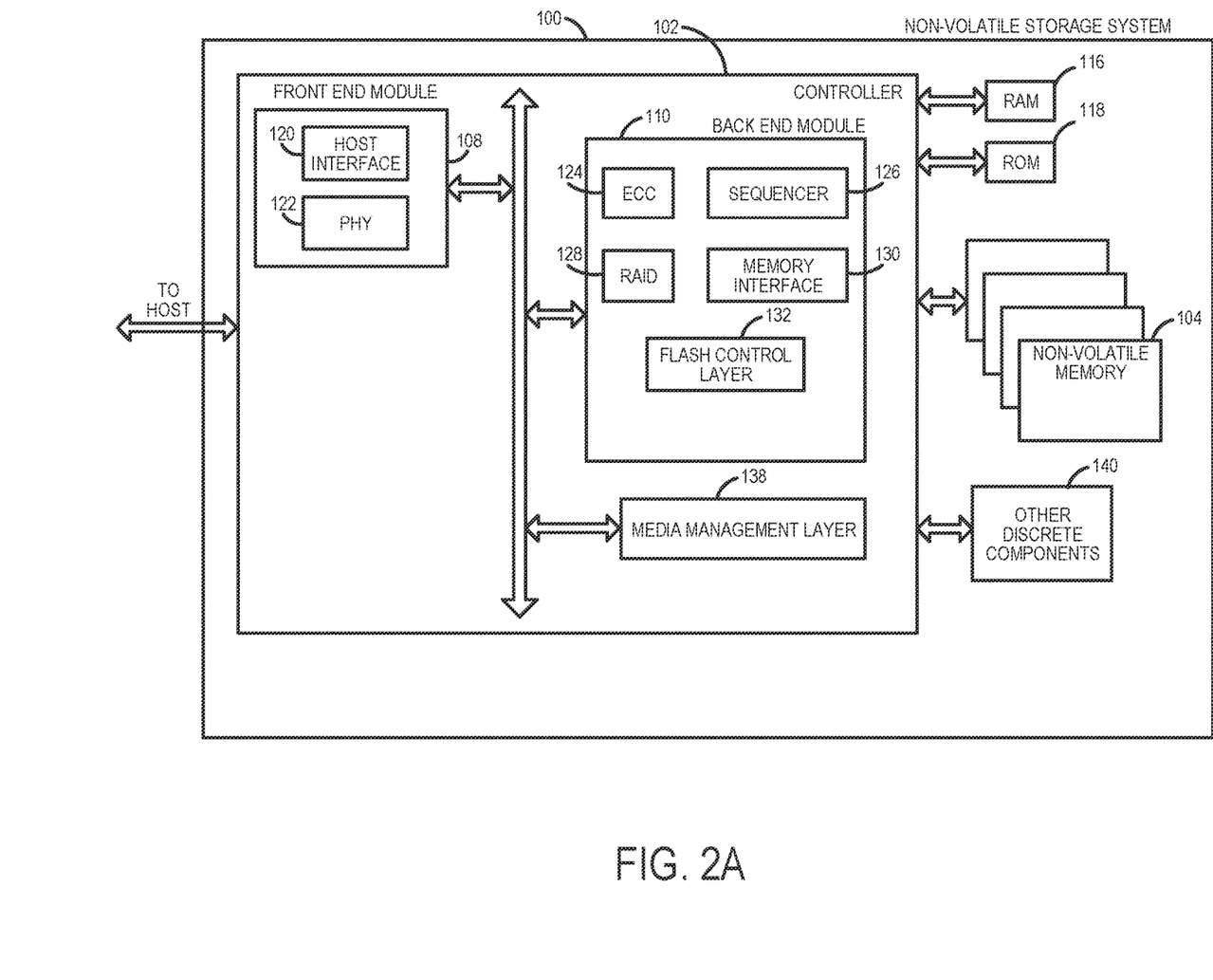
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
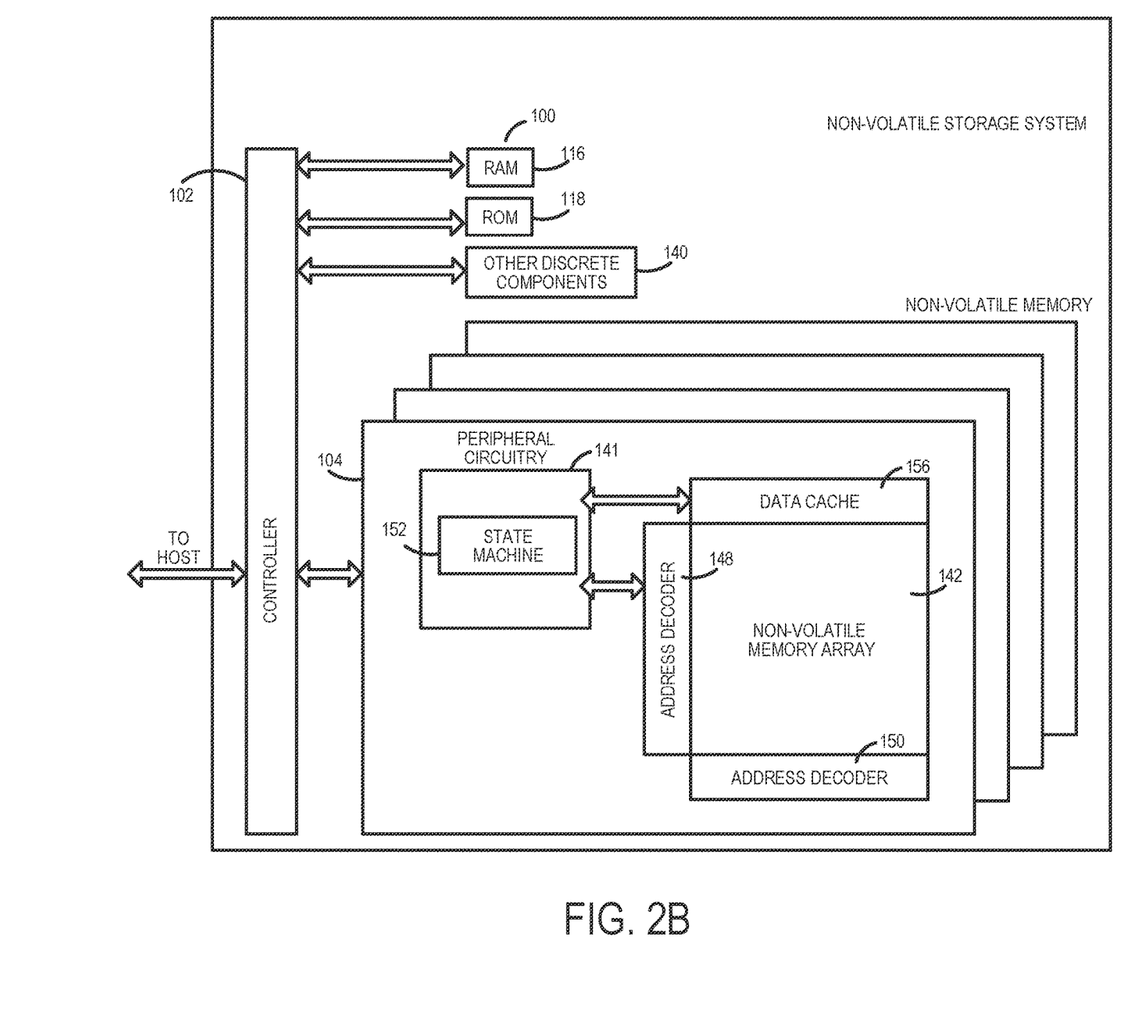
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
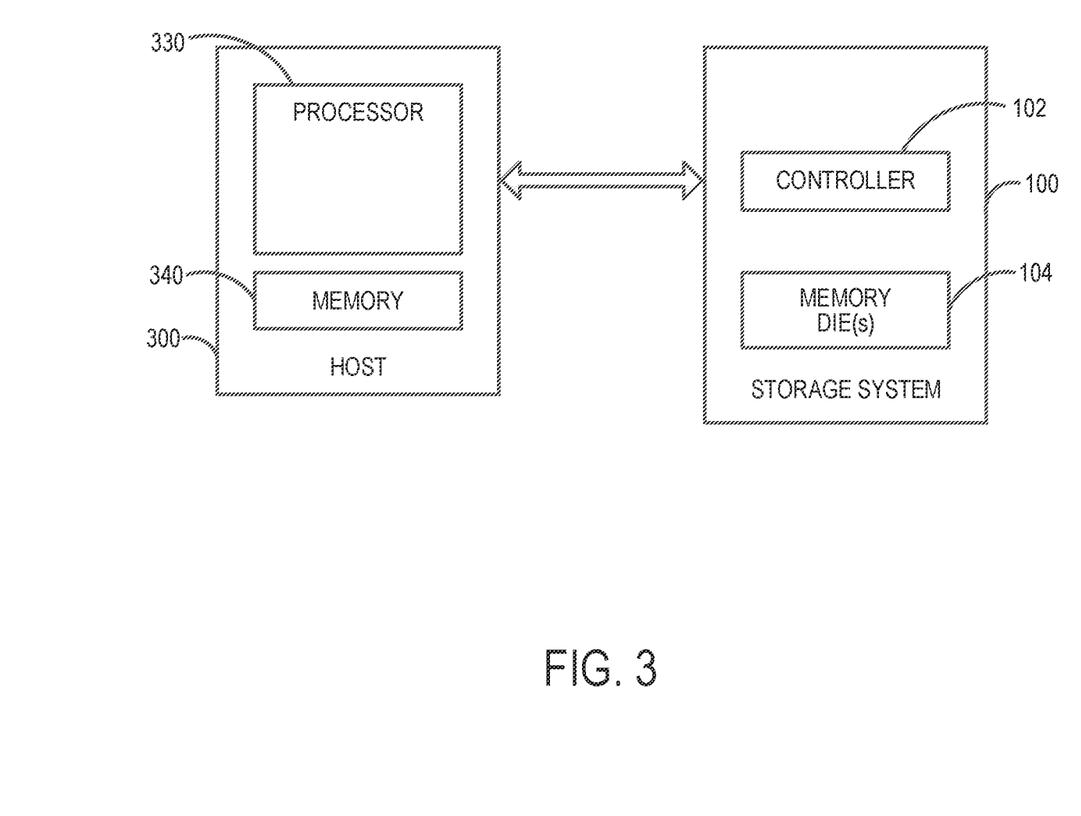
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The data storage device 100 can be used to store a data stream sent to it by the host 300. In one embodiment, the video data is stored in the memory 104 in the Moving Picture Experts Group Transport Stream (MPEG-TS) format, although other formats can be used. In general, with video compression, different video frames are compressed using different compression algorithms. Different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (JPEG) image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression.

Further, an Instantaneous Decoder Refresh (IDR) frame is a group of I-frame slices. With an IDR frame, all pictures in a reference buffer are marked as use for reference, and all subsequently-transmitted slices are decoded without reference to any frame decoded prior to the IDR frame. No frame after the IDR frame can reference any frame before it. IDR frames are used to avoid any distortions in the video when fast-forwarding. IDR frames are particularly useful for comparison to the reference image from the host because IDR frames are independently-decodable frames on par with an image.

Figure 4:
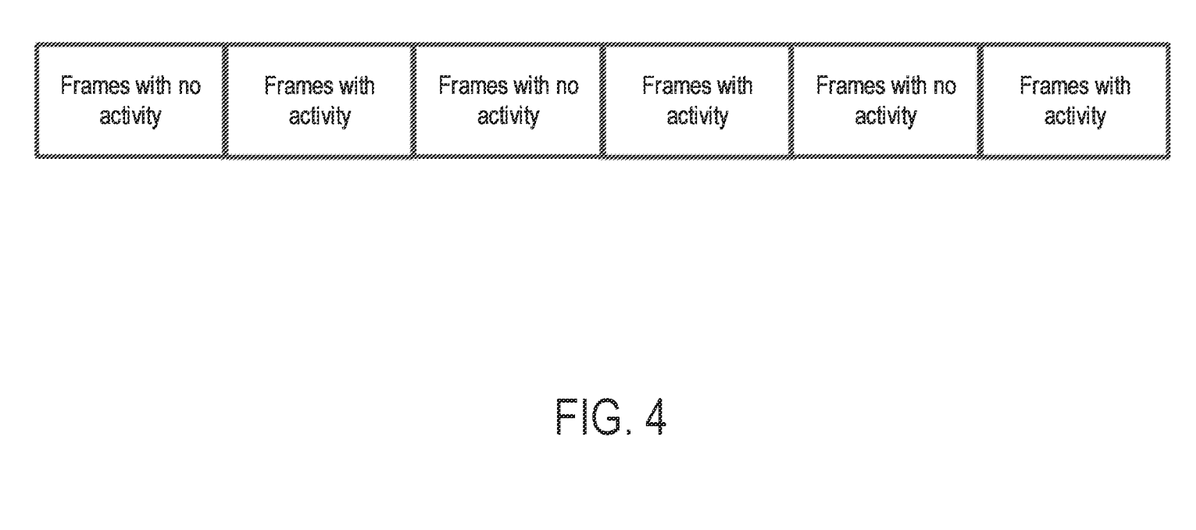
FIG. 4 is an illustration of frames of a surveillance recording of an embodiment.

As mentioned above, the data storage device 100 can store a data stream sent to it by the host 300 (the host 300 can be a surveillance system containing one or more cameras or be in communication with a surveillance system that contains one or more cameras). The data can be stored in memory in the Moving Picture Experts Group Transport Stream (MPEG-TS) format. Frames of interest (e.g., where certain action happens) can be scattered across the entire video recording, where periods of inactivity are interspersed with periods of activity, as shown in FIG. 4. Identification of these frames of interest is not straightforward, as it involves a user retrieving the entire stored video from the data storage device and going through the footage manually at a normal or faster playback speed. This requires a lot of manual work as frames cannot be skipped and must be browsed through to identify any activity.

To reduce bandwidth and latency, the controller 102 in the data storage device 100 can determines entropy of the data, segregate high-entropy data as another file, and uses the data as a way for quick playback either in real time or non-real time. More specifically, the controller 102 can identify a plurality of frames in the video data (sometimes referred to herein as "media data") stored in the memory 104 that differ from surrounding frames by more than a threshold amount by defining "instances" based on entropy change in the video data. As used herein, an "instance" refers to a set of closely-bound video frames with a sufficient delta above a threshold, which can be defined by the host 300 or by the data storage device 100, for example. In one embodiment, the instances are identified based on an entropy change (e.g., a threshold delta change) in the video data over a time period. The entropy change defines the movement or specifically the delta difference or localized movement between closely-bound video frames in time. The entropy can be determined by the controller 102 through decoding. The controller 102 can detect multiple instances over time, accumulate them, and tag them with the corresponding time in the video stream. Such a collection of instances is referred to herein as an album, which is a downsized and event-only version of the stored video data with time tags. When the data storage device 100 receives a request from the host 300 for quick playback of the video data, the data storage device 100 can send the plurality of frames (the album) to the host 300 instead of the entire video file stored in the memory 104, which minimizes data transfers between the data storage device 100 and the host 300. The host 300 can later request more frames for a more-detailed playback. More details can be found in U.S. Pat. No. 11,328,511, which is hereby incorporated by reference.

In one embodiment, the controller 102 of the data storage device 100 can calculate entropy (as described above or using a different method) but store and maintain only the metadata of eventful frame numbers instead of creating a snapshot of frames itself in the memory 102. This further helps preserve endurance of the memory 104, conserves power, and increases performance. More specifically, the controller 102 can understand the underlying video encoding scheme. As the host 300 is recording the continuous video in the data storage device 100, the controller 102 can decode and calculate the entropy of various key frames in the background. The entropy can be calculated, for example, to identify the frames where a change in scene is detected. These can be the frames of interest for surveillance applications where the user is interested in identifying any movement in the field of vision of the camera. Frames whose entropy differs from previous frames by more than a threshold (e.g., a pre-defined threshold) are identified and remembered as markers in the data storage device 100. The metadata of the markers can be backed up in memory 104 during writes, and this can be passed on to the host 300, for example, through vendor-specific commands or during quick playback requests on the given logical range.

Due to this flexibility, in addition, the controller 102 may perform analytics on the images to determine the best set of frames among high-entropy data based on one or more parameters (e.g., image clarity, a clear image of a face, a clear number plate, etc.) and store the metadata of that set of frames. This act can be independent of other acts in the data storage device 100. The concept of metadata tagging and storage can be tweaked towards higher quality of service (QoS) of the algorithm. For example, the controller 102 can store markers based on the clarity of the stored data. Among multiple adjacent video frames, if the controller 102 determines certain frames (e.g., a person's face or a license play) are crisp and clear, the frames can be a part of the quick playback even though they do not form extended information.

Figure 5:
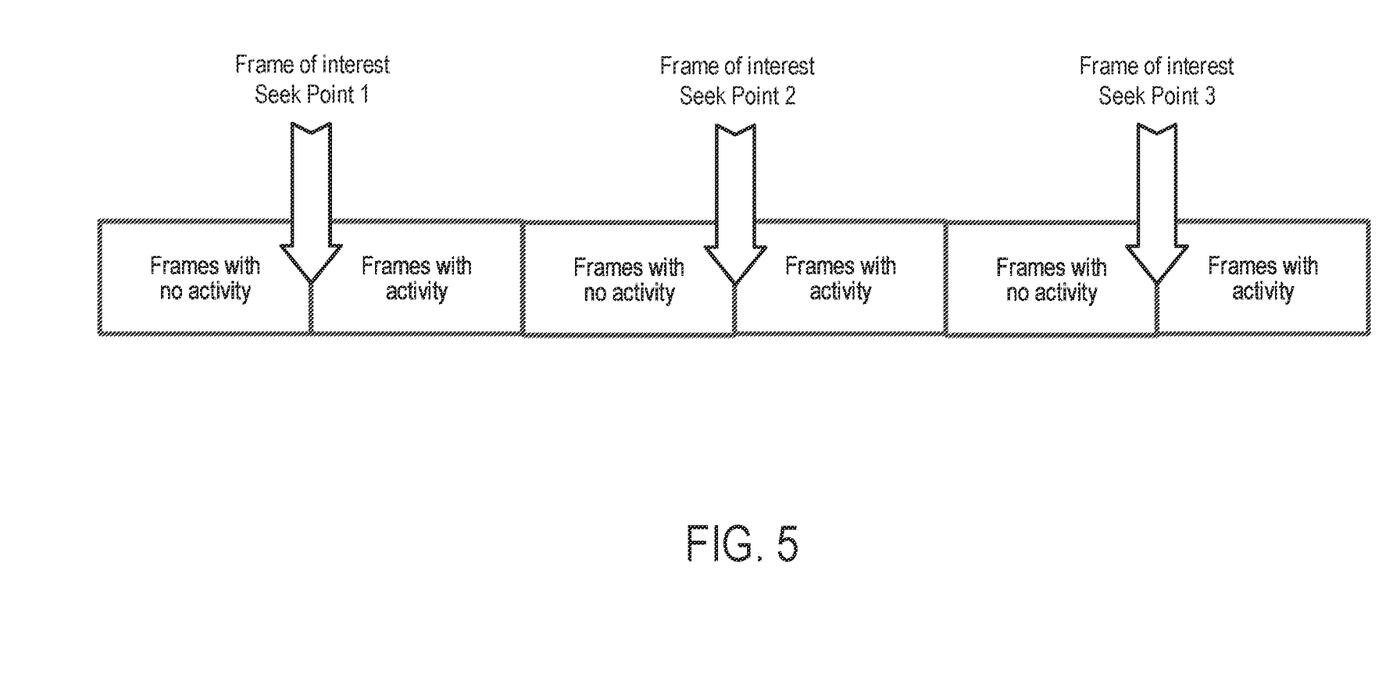
FIG. 5 is an illustration of the use of seek points of an embodiment.

When the time comes for playback (e.g., quick playback mode), the controller 102 can use the metadata and provide a suggestion to the host 300 on the relevant "seek points" in a closed loop based on the metadata of high-entropy frames (see FIG. 5). The host 300 may or may not leverage the data-storage-device-generated seek points, thereby enabling backward compatibility. The host 300 can have the option of making use of the markers (or metadata) to seek to the next frame of interest. The host 300 can skip multiple frames and "seek" directly to the frame of interest. In other words, the data storage device 100 generates "automatic skips." The host 300 can also have the option of ignoring the data storage device's suggested "seek" points and continue with the manual playback for legacy compatibility. As can be seen from the above example, the controller 102 can identify the start of activity and can suggest "seek" points to the host 300 where the playback can directly jump to.

The host 300 can query for the metadata (e.g., logical block address (LBA) or frame table) and use it to seek to frames of interest directly, thereby minimizing the need for manual analysis of footage. In this case, the host 300 may store the metadata back to the memory 104, and the files may be part of the file system. In addition, the controller 102 can tweak the analytics algorithm based on a host configuration to create "seek" metadata concentrating on specific objects of interests rather than the entropy of the data. Likewise, multiple seek tables may be created based on host configuration, enabling multiple efficient playback types for the host 300. For example, the controller 102 can generate a metadata table for all the frames involving a red car. Other frames showing movement, even if the frames are important, may not be considered in the table since those frames do not contain what the host 300 identified as being of interest.

Figure 6:
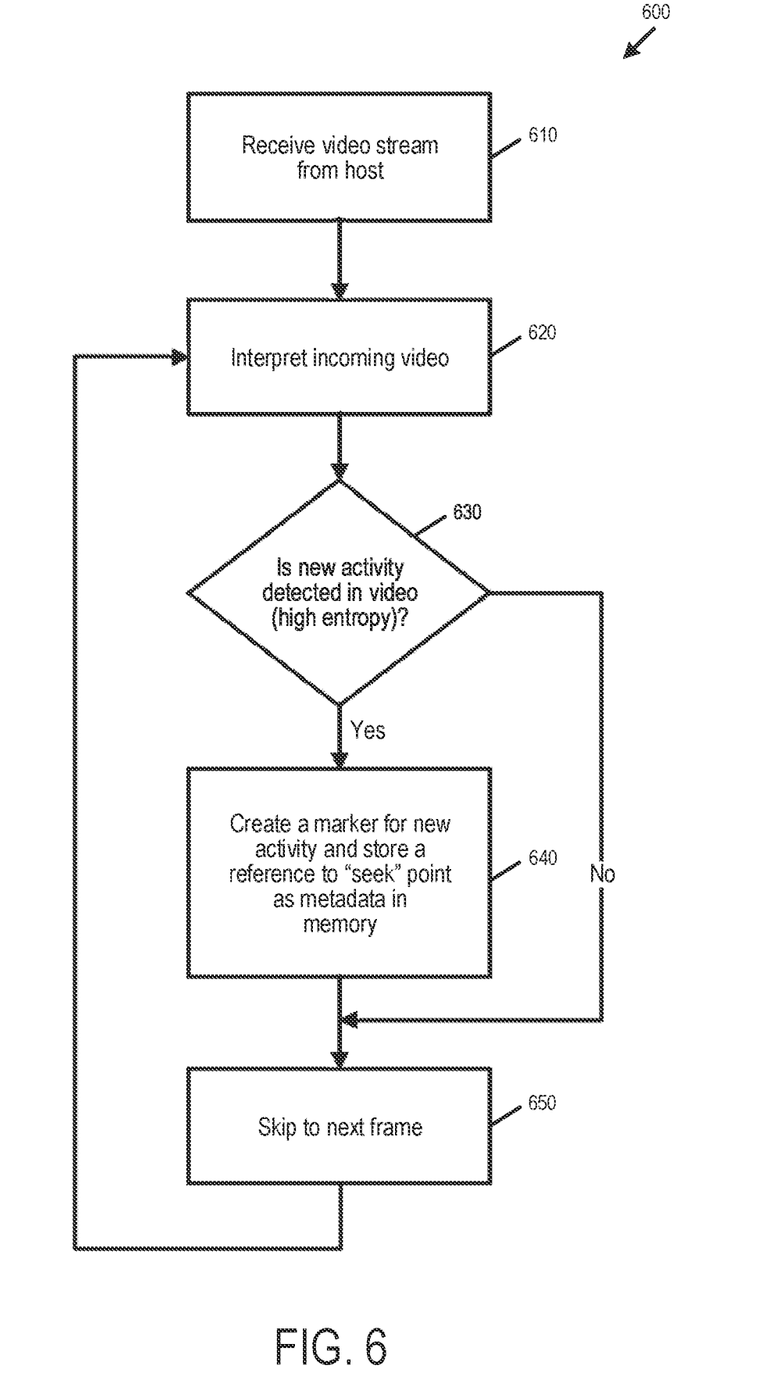
FIG. 6 is a flow chart of a method performed by a data storage device of an embodiment.
Figure 7:
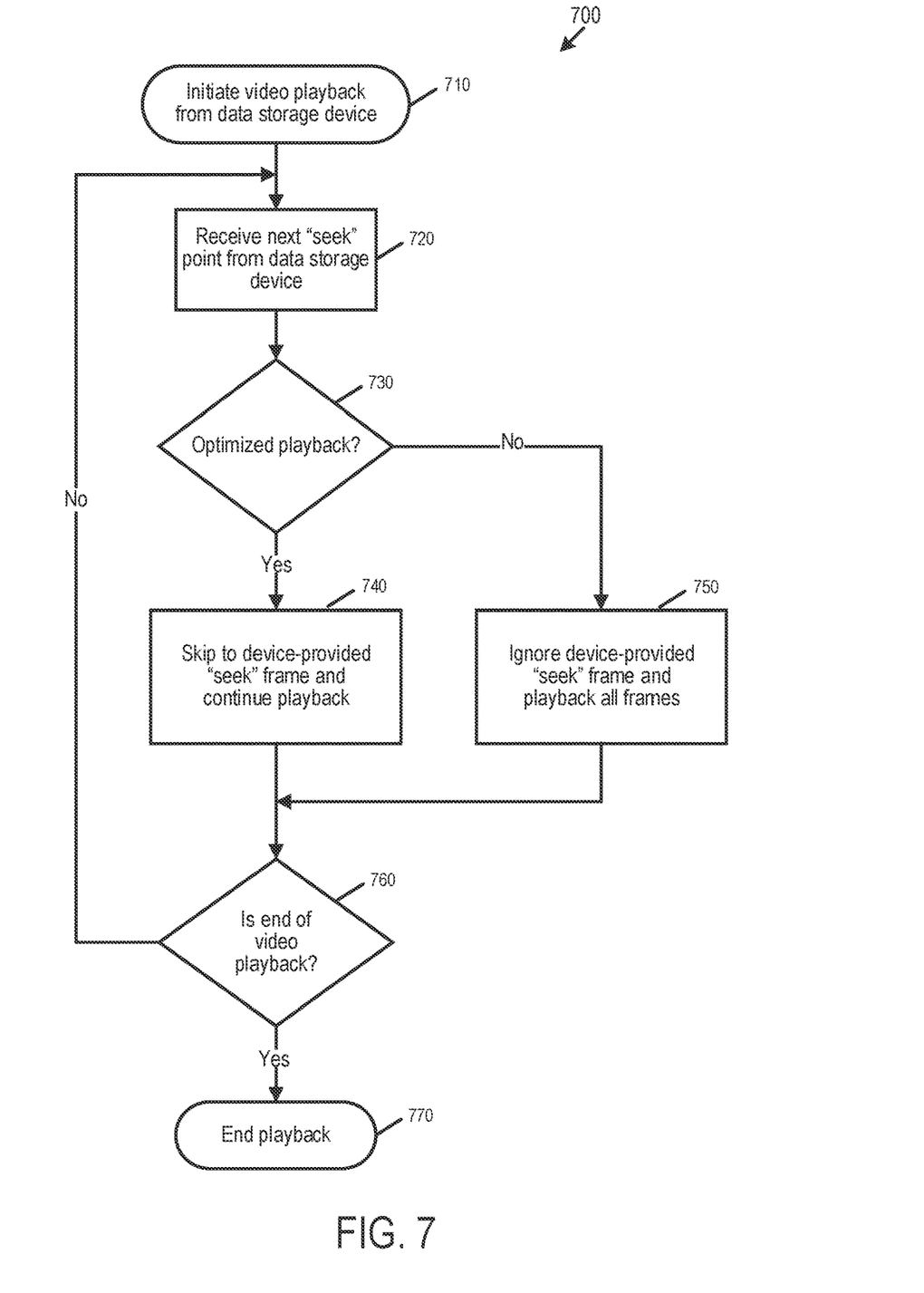
FIG. 7 is a flow chart of a method performed by a host of an embodiment.

FIGS. 6 and 7 provide flow charts 600, 700 of methods that illustrate the above operations. As shown in FIG. 6, when the data storage device 100 receives a video stream from the host 300 (act 610), the controller 102 in the data storage device 100 interprets the incoming video (act 620). The controller 102 then determines if there is new activity in sequential frames or groups of frames in the video (e.g., if there is high entropy above a threshold) (act 630). If new activity is not detected, the controller 102 skips to the next frame (act 650) and the method loops back to act 620. However, if new activity is detected, the controller 102 creates a marker for the new activity and stores a reference to a seek point in metadata in the memory 104 (act 640) and repeats the above process for the next frame (act 650).

As shown in FIG. 7, when the host 300 initiates video playback from the data storage device 100 (act 710), the controller 102 of the data storage device 100 provides the host 300 with the seek points that were stored in the memory 104 (act 720). The processor 330 of the host 300 then determines whether optimized playback is desired (act 730). If optimized playback is desired, the processor 330 of the host 300 skips to the device-provided seek frames and continues playback (act 740). If optimized playback is not desired, the processor 330 of the host 300 ignores the device-provided seek frames and playbacks back all the frames (act 750). In either case, the processor 330 of the host 300 determines if it is the end of the video playback (act 760) and ends playback (act 770) or loops back to act 720, accordingly.

There are several advantages associated with these embodiments. For example, these embodiments provide efficient analysis of playback video by allowing direct seeking to the frames of activity, thus allowing easier playback automation. Also, these embodiments can preserve memory endurance, reduce power consumption, and increase performance. Further, these embodiments can provide time-efficient playback and can consolidate important data for multiple purposes.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller configured to:
   receive a stream of video frames for storage in the memory;
   as each video frame is being received and stored in the memory:
   determine whether video data in the video frame differs from video data in an adjacent video frame by more than a threshold amount;
   determine whether a quality of the video frame meets a quality requirement; and
   in response to determining that the video data in the video frame differs from the video data in the adjacent video frame by more than the threshold amount and that the quality of the video frame meets the quality requirement, store a seek point to the video frame in the memory without storing a snapshot of the video frame in the memory; and
   in response to receiving a command from a host to play the video stream:
   determine whether the host is requesting quick playback;
   in response to determining that the host is requesting quick playback, send, to the host, the video frames associated with the seek points; and
   in response to determining that the host is not requesting quick playback, send, to the host, the stream of video frames.

2. The data storage device of claim 1, wherein the seek points comprise metadata.

3. The data storage device of claim 1, wherein the seek points comprise frame numbers.

4. The data storage device of claim 1, wherein the seek points are sent to the host using a vendor-specific command.

5. The data storage device of claim 1, wherein the seek points are sent to the host in response to receiving a quick-playback request from the host.

6. The data storage device of claim 1, wherein the seek points are sent to the host in response to receiving a request from the host for the seek points.

7. The data storage device of claim 1, wherein the controller is further configured to determine whether video data in the video frame differs from video data in the adjacent video frame based on entropy changes in the video data.

8. The data storage device of claim 1, wherein the controller is further configured to determine a best set of frames based on image clarity.

9. The data storage device of claim 1, wherein the seek points are sent to the host as a suggestion that the host is free to accept or disregard.

10. The data storage device of claim 1, wherein the controller is further configured to determine whether video data in the video frame differs from video data in the adjacent video frame using an algorithm that is based on a host configuration.

11. The data storage device of claim 1, wherein the controller is further configured to identify frames that contain an object of interest provided by the host.

12. The data storage device of claim 1, wherein the memory comprises a three-dimensional memory.

13. A method comprising:
   performing the following in a data storage device comprising a memory:
   receiving a stream of video frames for storage in the memory;
   as each video frame is being received and stored in the memory:
   determining whether video data in the video frame differs from video data in an adjacent video frame by more than a threshold amount;
   determining whether a quality of the video frame meets a quality requirement; and
   in response to determining that the video data in the video frame differs from the video data in the adjacent video frame by more than the threshold amount and that the quality of the video frame meets the quality requirement, storing a seek point to the video frame in the memory without storing a snapshot of the video frame in the memory; and
   in response to receiving a command from a host to play the video stream:
   determining whether the host is requesting quick playback;
   in response to determining that the host is requesting quick playback, sending, to the host, the video frames associated with the seek points; and
   in response to determining that the host is not requesting quick playback, sending, to the host, the stream of video frames.

14. The method of claim 13, wherein the seek points comprise frame numbers.

15. The method of claim 13, wherein the seek points are sent to the host using a vendor-specific command.

16. The method of claim 13, wherein the seek points are sent to the host in response to receiving a quick-playback request from the host.

17. The method of claim 13, wherein the seek points are sent to the host in response to receiving a request from the host for the seek points.

18. The method of claim 13, further comprising determining a best set of frames based on image clarity.

19. The method of claim 13, wherein the seek points are sent to the host as a suggestion that the host is free to accept or disregard.

20. A storage system comprising:
a memory;
means for receiving a stream of video frames for storage in the memory;
means for performing the following as each video frame is being received and stored in the memory:
determining whether video data in the video frame differs from video data in an adjacent video frame by more than a threshold amount;
determining whether a quality of the video frame meets a quality requirement; and
in response to determining that the video data in the video frame differs from the video data in the adjacent video frame by more than the threshold amount and that the quality of the video frame meets the quality requirement, storing a seek point to the video frame in the memory without storing a snapshot of the video frame in the memory; and means for performing the following in response to receiving a command from a host to play the video stream:
determining whether the host is requesting quick playback;
in response to determining that the host is requesting quick playback, sending, to the host, the video frames associated with the seek points; and
in response to determining that the host is not requesting quick playback, sending, to the host, the stream of video frames.

* * * * *